US010941026B2

(12) United States Patent
Wirth et al.

(10) Patent No.: US 10,941,026 B2
(45) Date of Patent: Mar. 9, 2021

(54) AUTONOMOUS INDUSTRIAL TRUCK

(71) Applicants: Linde Material Handling GmbH, Aschaffenburg (DE); STILL GmbH, Hamburg (DE)

(72) Inventors: Thomas Wirth, Hamburg (DE); Caspar Tügel, Hamburg (DE); Peter Krumbholz, Jakobsthal (DE); Dennis Hieke, Hamburg (DE); Udo Herrmann, Johannesberg (DE)

(73) Assignees: Linde Material Handling GmbH, Aschaffenburg (DE); STILL GmbH, Hamburg (DE)

( * ) Notice: Subject to any disclaimer, the term of this patent is extended or adjusted under 35 U.S.C. 154(b) by 14 days.

(21) Appl. No.: 16/111,355

(22) Filed: Aug. 24, 2018

(65) Prior Publication Data

US 2019/0064819 A1    Feb. 28, 2019

(30) Foreign Application Priority Data

Aug. 24, 2017  (DE) .......................... 10 2017 119 421

(51) Int. Cl.
*B66F 9/06* (2006.01)
*G05D 1/02* (2020.01)
*B60P 1/02* (2006.01)

(52) U.S. Cl.
CPC ............. *B66F 9/063* (2013.01); *G05D 1/021* (2013.01); *B60P 1/02* (2013.01); *G05D 2201/0202* (2013.01)

(58) Field of Classification Search
CPC ..... B25J 5/00; B25J 5/002; B25J 5/005; B25J 5/007; B25J 9/162; B66F 9/06;
(Continued)

(56) References Cited

U.S. PATENT DOCUMENTS 3,036,401 A * 5/1962 Stark .................... A47B 91/024
248/188.4
3,945,666 A * 3/1976 Fritsch .................... B66C 23/80
280/765.1

(Continued)

FOREIGN PATENT DOCUMENTS

CN     104631887 A  *  5/2015
DE        4231147 A1 *  4/1993   ................ B60S 9/08
(Continued)

OTHER PUBLICATIONS

EPO machine translation of JP 63-297165 (original JP document published Dec. 5, 1988) (Year: 1988).*

(Continued)

*Primary Examiner* — Faris S Almatrahi
*Assistant Examiner* — David A Testardi
(74) *Attorney, Agent, or Firm* — The Webb Law Firm

(57) ABSTRACT

An autonomous industrial truck, in particular an order-picking industrial truck, including an undercarriage to support the industrial truck on a roadway. The undercarriage is located on an undercarriage chassis and the industrial truck has a supporting chassis that is provided with supporting means. The supporting chassis can be adjusted relative to the undercarriage chassis between a raised position in which the supporting means are raised from the roadway and a lowered position in which the supporting means are lowered onto the roadway.

12 Claims, 2 Drawing Sheets

(58) Field of Classification Search
CPC ........ B66F 9/063; B66F 9/075; B66F 9/0755;
B66F 9/18; B66F 9/07559; B60P 1/02;
B60P 1/022; B60P 3/42; B60S 9/04;
B60S 9/08; B60S 9/10; B60S 9/12; B60S
9/18; B60S 9/20; B60S 9/205; B60S
9/22; E02F 9/085; B66C 23/78; B66C
23/80; G05D 1/021
See application file for complete search history.

(56) References Cited

U.S. PATENT DOCUMENTS

| | | | | | |
|---|---|---|---|---|---|
| 4,613,803 | A | * | 9/1986 | Hasegawa | G05B 19/4182 |
| | | | | | 318/587 |
| 4,663,925 | A | * | 5/1987 | Terada | A01D 46/24 |
| | | | | | 382/153 |
| 5,535,843 | A | * | 7/1996 | Takeda | B25J 5/007 |
| | | | | | 180/200 |
| 5,829,948 | A | * | 11/1998 | Becklund | B66F 7/0625 |
| | | | | | 414/607 |
| 9,889,562 | B1 | * | 2/2018 | Rembisz | B25J 9/1638 |
| 10,289,117 | B1 | * | 5/2019 | Zou | B65G 1/00 |
| 2003/0150657 | A1 | * | 8/2003 | Shupp | B66F 7/0625 |
| | | | | | 180/168 |
| 2006/0054395 | A1 | * | 3/2006 | Kovacic | B66F 7/08 |
| | | | | | 182/141 |
| 2008/0156759 | A1 | * | 7/2008 | Lai | A47B 87/0207 |
| | | | | | 211/187 |
| 2008/0166217 | A1 | * | 7/2008 | Fontana | B66F 9/063 |
| | | | | | 414/800 |
| 2013/0030661 | A1 | * | 1/2013 | Opperman | B25J 5/005 |
| | | | | | 701/50 |
| 2015/0175396 | A1 | * | 6/2015 | Ivanchenko | B66F 9/06 |
| | | | | | 414/664 |
| 2016/0159264 | A1 | * | 6/2016 | Ochenkowski | B60P 3/122 |
| | | | | | 414/544 |
| 2016/0280461 | A1 | * | 9/2016 | Geiger | B65G 1/1373 |
| 2016/0288810 | A1 | * | 10/2016 | Weiland | B02C 17/10 |
| 2016/0375813 | A1 | * | 12/2016 | Colantonio | B60P 1/02 |
| | | | | | 211/85.8 |
| 2017/0144547 | A1 | * | 5/2017 | Fuhlbrigge | B60L 50/66 |
| 2017/0144873 | A1 | * | 5/2017 | Colantonio | B66F 9/065 |
| 2017/0166399 | A1 | * | 6/2017 | Stubbs | B25J 9/0096 |
| 2017/0253283 | A1 | * | 9/2017 | Eidelson | B62D 51/001 |
| 2018/0004195 | A1 | * | 1/2018 | Finke | G05B 19/41895 |
| 2018/0345971 | A1 | * | 12/2018 | Birnschein | B60L 58/10 |
| 2019/0176911 | A1 | * | 6/2019 | Beitzen-Heineke | |
| | | | | | B62D 49/0678 |
| 2020/0189623 | A1 | * | 6/2020 | Nishizawa | B61D 47/00 |

FOREIGN PATENT DOCUMENTS

| | | | | |
|---|---|---|---|---|
| DE | 202012100479 | U1 | * | 4/2012 |
| DE | 102015114408 | A1 | | 3/2017 |
| DE | 102015114409 | A1 | * | 3/2017 |
| EP | 2987761 | A1 | | 2/2016 |
| EP | 3031769 | A1 | * | 6/2016 |
| JP | 60148774 | A | * | 8/1985 ............ B62D 15/00 |
| JP | 63297165 | A | * | 12/1988 |
| JP | 02109763 | A | * | 4/1990 |
| JP | 09256768 | A | * | 9/1997 |
| JP | 2000344478 | A | * | 12/2000 ............... B60S 9/08 |
| JP | 2007210406 | A | | 8/2007 |
| JP | 2007210407 | A | * | 8/2007 ............ B62D 15/00 |
| JP | 2007210729 | A | | 8/2007 |
| WO | WO-82/01363 | A1 | * | 4/1982 |

OTHER PUBLICATIONS

EPO machine translation of JP 2000-344478 (original JP document published Dec. 12, 2000) (Year: 2000).*

JBT Corp., "Outrigger SGV", 2010 brochure, 2 pages. (Year: 2010).*

Legius, M. J. E., et al., "Simulating the dynamical behavior of an AGV", (D&C; vol. 2014.012). Eindhoven: Eindhoven University of Technology, 2014, 54 pages. (Year: 2014).*

* cited by examiner

AUTONOMOUS INDUSTRIAL TRUCK

CROSS REFERENCE TO RELATED APPLICATIONS

This application claims the benefit of German Patent Application No. DE 10 2017 119 421.5, filed Aug. 24, 2017, the disclosure of which is incorporated in its entirety herein.

BACKGROUND OF THE INVENTION

Field of the Invention

The disclosure relates to an autonomous industrial truck, in particular, an order-picking industrial truck, that has an undercarriage to support the industrial truck on a roadway.

Description of Related Art

Order-picking industrial trucks are used for order-picking goods, whereby packages are moved between a cargo area of the industrial truck, which can be formed by a storage area on the industrial truck or of a cargo carrier being carried by the industrial truck, such as a pallet or trolley, and a storage site located laterally next to the industrial truck. The storage site can be a shelf compartment of a shelf that is located laterally next to the industrial truck or a pallet located laterally next to the industrial truck. To automate this process, it is known that the order-picking truck can be autonomous and, therefore, a driverless industrial truck. The industrial truck can be provided with a cargo handling manipulator arm for the handling of the packages. Using the cargo handling manipulator arm, a package located outside the footprint (base area) of the industrial truck in a storage site located next to the industrial truck can be picked up and deposited on the cargo area of the industrial truck. The same process can be executed in reverse, whereby the cargo handling manipulator arm can pick up a package located in the cargo area of the industrial truck and deposit it in a storage site located laterally next to the industrial truck outside the footprint (base area) of the industrial truck.

A conventional order-picking industrial truck with a projecting cargo handling manipulator arm that can reach an area outside the footprint (base area) of the industrial truck is known from EP 2 987 761 A1.

During the operation of the cargo handling manipulator arm, for example, during the handling of the package, the stability of the industrial truck supported by the undercarriage on the roadway may be threatened, as a result of which the industrial truck can tip. This can occur when the cargo handling manipulator arm is a tall structure on the industrial truck or when large dynamic loads are generated during the operation of the cargo handling manipulator arm.

The tipping of the industrial truck slows down the order-picking process and can damage the industrial truck, the cargo handling manipulator arm, or the package being handled.

SUMMARY OF THE INVENTION

The object of this disclosure is to make available an industrial truck of the type described above that eliminates the cited disadvantages.

To accomplish this objective, the disclosure teaches that the undercarriage is located on an undercarriage chassis and the industrial truck has a supporting chassis that is provided with supporting means (also referred to as a supporting arrangement). The supporting chassis is adjustable relative to the undercarriage chassis between an elevated position in which the supporting means are raised from the roadway and a lowered position in which the supporting means are lowered onto the roadway.

Therefore, the industrial truck, with the supporting chassis and the undercarriage chassis, has two chassis that are vertically adjustable relative to each other. The stability on an autonomous industrial truck, in particular an order-picking industrial truck, is temporarily increased by lowering the supporting chassis. The supporting means come into contact with the roadway and, therefore, the industrial truck is no longer standing on the roadway and supported with the undercarriage but, instead, is supported with the supporting means of the supporting chassis on the roadway, thereby eliminating the risk of tipping of the industrial truck. Consequently, the stability of the industrial truck can be significantly increased, especially when a cargo handling manipulator arm of the industrial truck is located outside the footprint (base area) of the industrial truck. When the supporting chassis is in the lowered position, it also makes it possible to increase the stability of the industrial truck when the wheels of the undercarriage of the industrial truck are tilted. By activating the supporting chassis into the lowered position, the resulting increase in the stability of the industrial truck can accelerate the order-picking process and minimize the risk of damage to the industrial truck, the cargo handling manipulator arm, or the package being handled. Since the supporting means are located on the supporting chassis, all the supporting means located on the supporting chassis are lowered and raised simultaneously, as a result of which the order-picking process is further accelerated because waiting times to lower and raise the supporting means are minimized.

In one advantageous aspect of the disclosure, the supporting means in the lowered position are outside the undercarriage. In the lowered position, the supporting means are preferably at some distance from the wheels of the undercarriage in the transverse direction of the vehicle and/or in the longitudinal direction of the vehicle. As a result of which, the contact area spanned by the supporting means is larger than the contact area spanned by the wheels of the undercarriage, so it becomes possible to increase the stability of the industrial truck in a simple manner.

In one advantageous aspect of the disclosure, a lifting device is provided between the undercarriage chassis and the supporting chassis for the adjustment of the supporting chassis between the raised position and the lowered position. With a lifting device, the supporting chassis and the supporting means located on the supporting chassis can be raised and lowered quickly and easily.

In the raised position of the supporting chassis, the undercarriage is advantageously standing on the roadway. For traction operation, the industrial truck is supported on the roadway by means of the wheels of the undercarriage.

In one advantageous aspect of the disclosure, in the lowered position of the supporting chassis, the undercarriage is raised from the roadway. For an order-picking process, the industrial truck is supported on the roadway only with the supporting means. By raising the undercarriage from the roadway, a kinematic redundancy is prevented, since in the lowered position of the supporting chassis, the industrial truck is standing on the roadway and is supported only by the supporting means of the supporting chassis. Consequently, the stability of the industrial truck during the order-picking process can be further increased with a stationary industrial truck.

It is particularly advantageous if the supporting chassis surrounds the undercarriage chassis in the circumferential direction in the manner of a frame and/or encloses it in the manner of a cover. The industrial truck, with the supporting chassis and the undercarriage chassis, has two chassis. The height between the supporting chassis and the undercarriage chassis can be adjusted, whereby the undercarriage chassis, which is provided with the undercarriage, forms an inner chassis and the supporting chassis, which is provided with the supporting means, forms an outer chassis.

In one advantageous aspect of the disclosure, the lifting device is in the form of a scissor lifting device. A scissor lifting device is compact, has a large lifting range, and is particularly well suited for the vertical adjustability of the supporting chassis relative to the undercarriage chassis.

Additional advantages can be achieved if, as in one advantageous aspect of the disclosure, the bottom edge of the supporting chassis, in the raised position, has a maximum gap height of 35 mm from the roadway. A high level of operational safety of the industrial truck is thereby achieved since the supporting means on the supporting chassis can be placed as far outboard as possible without endangering persons who are in the vicinity of the industrial truck. The stability provided by the supporting chassis can be increased without endangering persons who are in the vicinity of the industrial truck.

In one preferred aspect of the disclosure, the supporting chassis is provided with four supporting means, each of which is located in one of the corner areas of the supporting chassis. It is contemplated that more or fewer supporting means can be provided on the supporting chassis. When there are four supporting means, three supporting means on the supporting chassis are preferably in the form of rigid supporting means and the fourth supporting means are elastic supporting means. Consequently, potential irregularities in the roadway can be easily compensated for and a stable and secure support of the industrial truck can be achieved by means of the supporting means in the lowered position of the supporting chassis.

In one preferred aspect of the disclosure, the supporting means can be in the form of bulges on the supporting chassis. This makes possible a simple manufacture of the supporting means. Alternatively, the supporting means can be in the form of contact bodies, in particular plastic bodies located on the supporting chassis, or in the form of rollers or spheres rotationally mounted on the supporting chassis.

Additional advantages result if the supporting means are located in an adjustable manner on the supporting chassis. It becomes possible to adjust, calibrate, and/or re-level the supporting means on the supporting chassis, as a result of which it becomes possible in a simple manner to compensate for manufacturing tolerances and/or wear.

In one advantageous aspect of the disclosure, the industrial truck is provided with a cargo handling manipulator arm that has a cargo holding device, whereby the cargo handling manipulator arm can reach an area outside the footprint (base area) of the industrial truck. By lowering the supporting chassis on the industrial truck according to the disclosure, the stability of the industrial truck can be temporarily increased in a simple manner, when in an order-picking operation, a package located outside the footprint (base area) of the industrial truck in a storage site located laterally next to the industrial truck is picked up with the projecting cargo handling manipulator arm and deposited on the cargo area of the industrial truck, or a package located on the cargo area of the industrial truck is picked up with the cargo handling manipulator arm and deposited in a storage site located laterally next to the industrial truck and outside the footprint (base area) of the industrial truck.

In one advantageous aspect of the disclosure, the cargo handling manipulator arm can be in the form of a robot arm, a crane arm, or an articulated arm.

It is particularly advantageous if, as in one aspect of the disclosure, the cargo handling manipulator arm is located on the supporting chassis. As a result of a location and fastening of the cargo handling manipulator arm on the raiseable or lowerable supporting chassis, a favorable flux of force is generated during the load-picking operation in which the supporting chassis with the supporting means is supported on the roadway, because the cargo handling manipulator arm and a cargo held by it are supported directly by means of the supporting chassis on the roadway. The resulting forces are supported directly by means of the supporting chassis on the roadway and a flux of forces via the undercarriage chassis and the lifting device is avoided.

The disclosure further relates to a method for the operation of an autonomous industrial truck, whereby the supporting chassis is actuated into the raised position during traction operation of the industrial truck and the supporting chassis is actuated into the lowered position during order-picking operations. Packages are moved by means of the cargo handling manipulator arms between a cargo area of the industrial truck and a storage site located laterally next to the industrial truck. By lowering the supporting chassis on the industrial truck, it becomes possible to temporarily increase the stability of the industrial truck in a simple manner during an order-picking operation, and when the industrial truck is stationary, to pick up a package located in a storage site located laterally next to the industrial truck outside the footprint (base area) of the industrial truck by means of the projecting cargo handling manipulator arm and to deposit it on the cargo area of the industrial truck, or with the cargo handling manipulator arm, to pick up a package located on the cargo area of the industrial truck and to deposit it in a storage site located laterally next to the industrial truck and outside the footprint (base area) of the industrial truck.

BRIEF DESCRIPTION OF THE DRAWING

Additional advantages and details of the disclosure are explained in greater detail below with reference to the exemplary aspect illustrated in the accompanying schematic figures, in which.

DESCRIPTION OF THE DISCLOSURE

Figure 1:
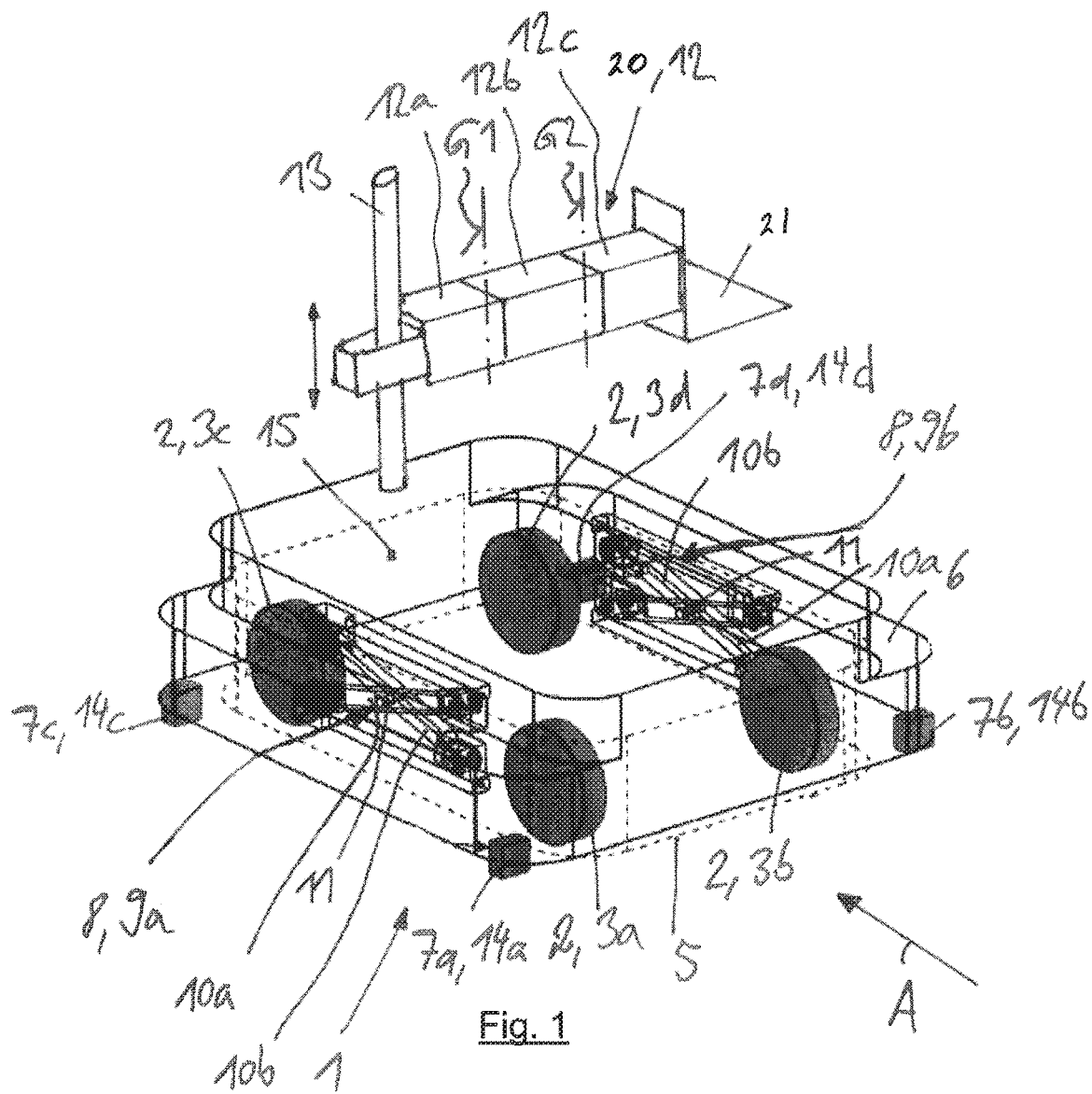
FIG. 1 is a perspective view of an industrial truck according to the disclosure showing the internal components of the industrial truck viewed through a top surface thereof.

FIG. 1 shows an autonomous industrial truck 1 according to the disclosure that has an undercarriage 2 to support the industrial truck 1 on a roadway FB. The industrial truck 1 in the illustrated exemplary aspect is an order-picking industrial truck.

The undercarriage 2 in the illustrated exemplary aspect is formed by four wheels 3a, 3b, 3c, 3d. The wheels 3a, 3b are drive wheels and the wheels 3c, 3d are non-driven casters. The drive wheels 3a, 3b, which can be driven at different speeds of rotation, make possible a differential speed steering of the industrial truck 1. Alternatively, the drive wheels 3a, 3b can be steerable around a vertical axis by means of a steering drive that is not illustrated in any further detail to achieve the steering of the industrial truck 1.

According to the disclosure, the industrial truck 1 has an undercarriage chassis 5 that is provided with the undercarriage 2 and the wheels 3a-3d, and a supporting chassis 6 that is provided with supporting means 7a, 7b, 7c, 7d (also referred to as supporting arrangements). The supporting chassis 6 can be adjusted relative to the undercarriage chassis 5 between a raised position (illustrated in FIG. 2), in which the supporting means 7a-7d are raised from the roadway FB, and a lowered position (illustrated in FIG. 3) in which the supporting means 7a-7d are lowered onto the roadway FB.

Figure 2:
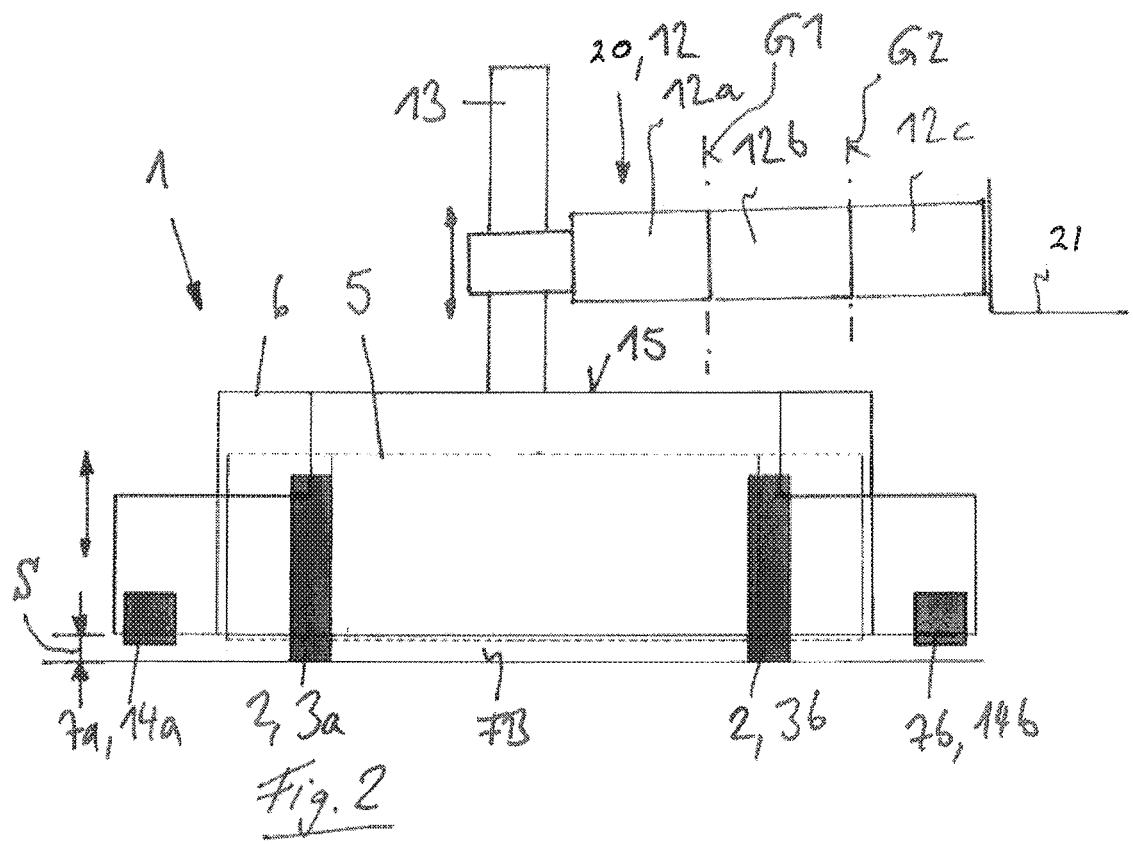
FIG. 2 is a front view of the industrial truck in a view along line A in FIG. 1 with a supporting chassis in the raised position.
Figure 3:
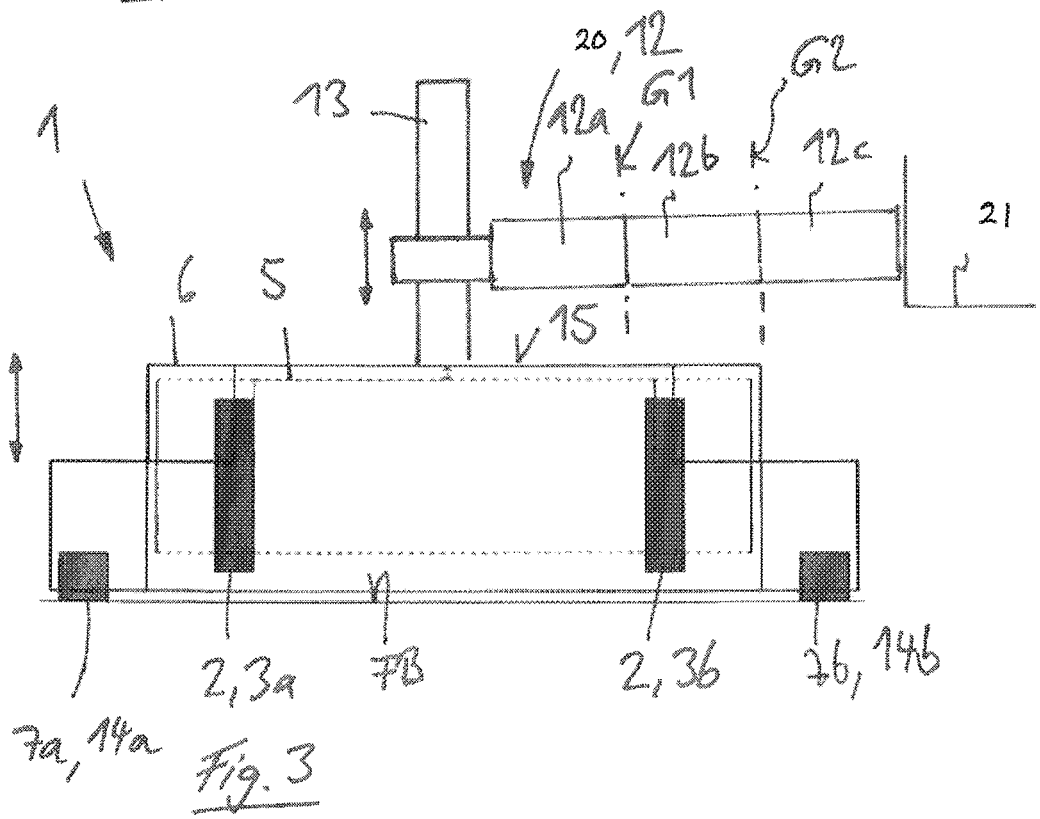
FIG. 3 is a front view of the industrial truck illustrated in FIG. 2 with a supporting chassis in the lowered position.

In FIGS. 1 to 3, the undercarriage chassis 5 is illustrated in broken lines and the supporting chassis 6 in solid lines.

In the illustrated exemplary aspect, the supporting chassis 6 surrounds the undercarriage chassis 5 in the circumferential direction in the manner of a frame. In the illustrated exemplary aspect, the supporting chassis 6 also encloses the undercarriage chassis 5 in the manner of a cover. The supporting chassis 6 provided with the supporting means 7a-7d forms an outer chassis and the undercarriage chassis 5 provided with the undercarriage 2 forms an inner chassis that is located completely inside the supporting chassis 6.

The supporting means 7a-7d located on the supporting chassis 6 are located outside the wheels 3a-3d of the undercarriage 2. The supporting means 7a-7d lie farther outboard relative to the wheels 3a-3d of the undercarriage 2.

A lifting device 8 is located between the undercarriage chassis 5 and the supporting chassis 6 to move the supporting chassis 6 between the raised position and the lowered position. In one example, the lifting device 8 is connected between the undercarriage chassis 5 and the supporting chassis 6 laterally in a left-right direction.

In the illustrated exemplary aspect, the lifting device 8 is in the form of a scissor lifting device 9a, 9b each disposed, as shown in FIG. 1, in a lateral gap between the undercarriage chassis 5 and the supporting chassis 6. Scissor lifting devices 9a and 9b are located, respectively, on opposite sides of the industrial truck. Each scissor lifting device 9a, 9b includes two crossing guide rods 10a, 10b that are connected with each other at an intersection point by means of a joint 11. Each guide rod 10a and 10b is fastened with a first, lower end to the undercarriage chassis 5 and with a second, upper end to the supporting chassis 6.

As shown in FIG. 2, in the raised position of the supporting chassis 6, the undercarriage 2 is in contact with the roadway FB, so that the industrial truck 1 with the wheels 3a-3d of the undercarriage 2 is supported on the roadway FB.

As shown in FIG. 3, in the lowered position of the supporting chassis 6, the undercarriage 2 is raised from the roadway FB so that the industrial truck 1 is supported on the roadway FB only with the supporting means 7a-7d of the supporting chassis 6.

In the raised position (shown in FIG. 2), the supporting chassis 6 preferably has a maximum gap height S of 35 mm from the roadway FB.

In the illustrated exemplary aspect, the supporting chassis 6 is provided with four supporting means 7a-7d, each of which is located in one of the corner areas of the supporting chassis 6, which has an essentially rectangular shape when viewed from overhead.

In the illustrated exemplary aspect, the supporting means 7a-7d are each formed by contact bodies 14a-14d, e.g. plastic bodies, located on the supporting chassis 6.

Preferably, the supporting means 7a-7d in the form of contact bodies 14a-14d are adjustably mounted on the supporting chassis 6, as a result of which they can be calibrated and adjusted in the vertical direction.

For the handling of cargo, the industrial truck 1 is provided with a cargo handling manipulator arm 20 that is provided with a load carrying device 21. The cargo handling manipulator arm 20 can reach an area outside the footprint (base area) of the industrial truck 1 and, therefore, projects laterally outward so that it can reach loads on a shelf located laterally next to the industrial truck 1 or on a pallet located laterally next to the industrial truck 1.

In the illustrated exemplary aspect, the cargo handling manipulator arm 20 is an articulated arm 12 that consists of a plurality of articulated arms 12a, 12b, 12c, which are connected to one another in an articulated manner by means of vertical articulated shafts G1, G2.

The cargo handling manipulator arm 20 further includes a column 13 on which the cargo handling manipulator arm 20 is located so that it can be adjusted vertically by means of a lifting drive not shown in any further detail and can therefore be raised and lowered.

In the illustrated exemplary aspect, the cargo handling manipulator arm 20 is located on the supporting chassis 6.

The supporting chassis 6, which encloses the undercarriage chassis 5 in the manner of a cover, has on the upper side thereof, a cargo area 15 that can be in the form of a cargo area on which the packages can be deposited, or on which a cargo carrier can be carried, such as a pallet or trolley on which the packages can be deposited.

The autonomous industrial truck 1 according to the disclosure is in the form of an order-picking truck for order-picking goods, whereby packages can be moved by the cargo handling manipulator arm 20 between the cargo area of the industrial truck 1, which is formed by the cargo area 15 on the industrial truck 1 or by a cargo carrier, such as a pallet or trolley, that can be carried on the cargo area 15, and a storage site located laterally next to the industrial truck 1. The storage area can be a shelf, a pigeonhole of a shelf located laterally next to the industrial truck 1, or a pallet located laterally next to the industrial truck 1. With the projecting cargo handling manipulator arm 20, a package located in a storage site located laterally next to the industrial truck outside the footprint (base area) of the industrial truck 1 can be picked up and deposited on the cargo area 15 of the industrial truck 1. The same is true for the process in reverse, whereby with the cargo handling manipulator arm 20, a package located on the cargo area 15 of the industrial truck 1 can be picked up and deposited in a storage site located laterally next to the industrial truck 1 and outside the footprint (base area) of the industrial truck 1.

During traction operation of the industrial truck 1, the supporting chassis 6 is actuated by means of the lifting device 8 into the raised position, as illustrated in FIG. 2. During traction operation, the cargo handling manipulator arm 20 and a cargo being carried are inside the footprint (base area) of the industrial truck 1, so that the center of gravity is inside the contact area of the wheels 3a-3d of the undercarriage 2.

During the order-picking process, in which cargo, such as packages, is moved by means of the cargo handling manipulator arm 20 projecting beyond the footprint (base area) of the industrial truck 1 between the cargo area 15 of the industrial truck and a storage site located laterally next to the industrial truck 1, while the industrial truck 1 is stationary, the supporting chassis 6 is actuated by means of the lifting device 8 into the lowered position, as illustrated in FIG. 3. In the lowered position of the supporting chassis 6, the industrial truck 1 is standing with the supporting means 7a-7d located on the support chassis 6 on the roadway FB and is supported on the roadway FB. The supporting means 7a-7d are located farther outboard on the industrial truck 1 than the wheels 3a-3d of the undercarriage 2, such that the stability of the industrial truck 1 during an order-picking process with a projecting cargo handling manipulator arm 20 is increased as a result of the lowering of the supporting chassis 6 with the supporting means 7a-7d located farther outboard. The order-picking process is accelerated and damage to the industrial truck 1, the cargo handling manipulator arm 20, or to the package being handled can be prevented.

The lifting device 8 is preferably realized so that the lifting device 8 can a) in a lower lifting stage, lower the supporting means 7a-7d onto the roadway FB, b) in a middle lifting stage, make it possible for the industrial truck 1 to run under a cargo carrier, such as a pallet or a trolley, and c) in an upper lifting stage, raise the cargo carrier and pick up in the cargo area 15. Therefore, the effort and expense required to increase stability is further reduced because the lifting device 8, which is already present to pick up a cargo carrier, is also used to lower the supporting chassis 6 to set down the supporting means 7a-7d on the roadway FB to increase the stability of the industrial truck 1.

As a result of the location of the supporting means 7a-7d on the outer surrounding supporting chassis 6, persons in the vicinity of the industrial truck are also protected against being crushed as the supporting chassis 6 is being lowered, so that no monitoring of potential parts of the truck where body parts could be crushed or cut is necessary.

The disclosure is not limited to the illustrated exemplary aspect.

As alternatives to the contact bodies 14a-14d, parts that perform other functions can also be used as supporting means 7a-7d, such as, rotationally mounted rollers or spheres or bulges on the underside of the supporting chassis 6. The supporting means 7a-7d preferably have a spherical shape on the underside or are rotatable so that they can compensate for irregularities in the roadway.

The supporting means 7a-7d can be located at a single height or at different heights. If the supporting means 7a-7d are located at different heights, e.g. the supporting means 7a, 7c on one side of the vehicle are at a first height and the supporting means 7b, 7d on the opposite side of the vehicle are at a second height, when the supporting chassis 6 with the supporting means 7a-7d is lowered to the roadway, a controlled tilting and/or orientation of the truck 1 in a particular direction can be achieved.

While several aspects of the industrial truck 1 are described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. An autonomous industrial truck comprising:
an undercarriage to support the industrial truck on a roadway, wherein the undercarriage is located on an undercarriage chassis, and
the industrial truck has a supporting chassis that is provided with a supporting arrangement,
wherein the supporting chassis circumferentially surrounds the undercarriage chassis,
wherein a lateral gap is established between the supporting chassis and the undercarriage chassis,
wherein the supporting chassis can be adjusted relative to the undercarriage chassis between a raised position in which the supporting arrangement is raised from the roadway and a lowered position in which the supporting arrangement is lowered onto the roadway, and
wherein, to adjust the supporting chassis between the raised position and the lowered position, a scissor lifting device is positioned within the lateral gap between the undercarriage chassis and the supporting chassis.

2. The autonomous industrial truck as recited in claim 1, wherein, in the lowered position, the supporting arrangement is located outside the undercarriage.

3. The autonomous industrial truck as recited in claim 1, wherein, in the raised position of the supporting chassis, the undercarriage is standing on the roadway.

4. The autonomous industrial truck as recited in claim 1, wherein, in the lowered position of the supporting chassis, the undercarriage is raised from the roadway.

5. The autonomous industrial truck as recited in claim 1, wherein, in the raised position, the supporting chassis has a maximum gap height of 35 mm from the roadway.

6. The autonomous industrial truck as recited in claim 1, wherein the supporting arrangement comprises four supporting arrangements, each of which is located in a respective corner area of the supporting chassis.

7. The autonomous industrial truck as recited in claim 6, wherein the supporting arrangements are in the form of bulges of the supporting chassis, contact bodies located on the supporting chassis, or rollers or spheres rotationally mounted on the supporting chassis.

8. The autonomous industrial truck as recited in claim 6, wherein the supporting arrangements are adjustably located on the supporting chassis.

9. The autonomous industrial truck as recited in claim 1, wherein, for a handling of cargo, the industrial truck further comprises a cargo handling manipulator arm comprising a cargo carrying device, wherein the cargo handling manipulator arm can reach an area outside a footprint of the industrial truck.

10. The autonomous industrial truck as recited in claim 9, wherein the cargo handling manipulator arm comprises a robot arm, a crane arm, or an articulated arm.

11. The autonomous industrial truck as recited in claim 9, wherein the cargo handling manipulator arm is located on the supporting chassis.

12. A method for the operation of an autonomous industrial truck as recited in claim 1, the method comprising:
a) in traction operation of the industrial truck, actuating the supporting chassis into the raised position and
b) during order-picking operation, in which packages are moved by a cargo handling manipulator arm between a cargo area of the industrial truck and a storage site located laterally next to the industrial truck, actuating the supporting chassis into the lowered position.

* * * * *